United States Patent Office 2,927,094
Patented Mar. 1, 1960

2,927,094

RESINS FROM EPOXIDIZED LIQUID DIENE POLYMERS AND PHENOL ALDEHYDE RESINS AND METHOD OF MAKING SAME

Charles E. Wheelock, Bartlesville, Okla., assignor to Phillips Petroleum Company, a corporation of Delaware No Drawing. Application December 2, 1957
Serial No. 699,928

8 Claims. (Cl. 260—43)

This invention relates to resins from epoxidized liquid diene polymers and phenol aldehyde resins. In copending applications, Serial No. 612,890, filed September 28, 1956, and Serial No. 626,286, filed December 5, 1956, epoxidized diene polymers have been described. These epoxy compounds are those wherein an oxygen atom bridges adjacent carbon atoms, said carbon atoms being joined by a single valence bond. It is further disclosed therein that these polymers are useful as resins for varying uses such as laminating, casting, and coating compositions. I have now discovered another curing system for epoxidized polymers of this type.

The following are objects of my invention.

An object of this invention is to provide thermosetting resins. A further object of this invention is to provide an improved curing system for epoxidized liquid polybutadiene. A further object of this invention is to provide a thermoset resin comprising a mixture of epoxidized liquid polybutadiene and a phenol aldehyde resin.

Other objects and advantages of this invention will become apparent to one skilled in the art upon reading the accompanying disclosure.

This invention relates to a thermosetting resin comprising a mixture of an epoxidized liquid diene polymer containing 0.08 to 0.8 epoxy group per aliphatic double bond originally present in the polymer and at least 10 percent of the original aliphatic unsaturation, and a reactive phenol aldehyde condensate containing reactive hydroxyl groups. The best products are obtained when a catalyst is also used to accelerate the cure.

When the resins are prepared from homopolymers of butadiene, the products are characterized in that the original unsaturated portion of the molecule is converted by the epoxidation reaction to units of which (1) 8 to 70 percent, preferably 13 to 50 percent, of said units are selected from the group consisting of

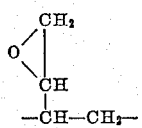

and

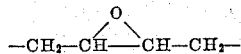

(2) up to 82 percent, preferably 50 to 77 percent, of said units are selected from the group consisting of

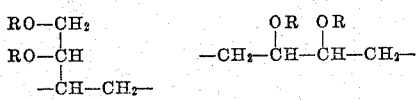

where R is selected from the group consisting of H and

R₁ being an alkyl, aryl, alkaryl, or aralkyl group of one to 20 carbon atoms, and (3) 10 to 35 percent of said units are selected from the group consisting of

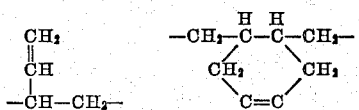

and

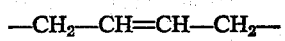

Of course, the present invention is not limited to these polymers but includes polymers, including copolymers, of dienes containing 4 to 6 carbon atoms. Furthermore, other monomers can be used in preparing the copolymers such as styrene, substituted styrene, vinyl ethyl ether, acrylonitrile, methacrylonitrile, ethyl acrylate, and the like.

The liquid polymers can be prepared by any suitable method including the use of sufficient amounts of mercaptan modifiers in emulsion polymerization systems to produce liquid polymers and by mass or solution polymerization using finely divided alkali metal catalysts. A particularly preferred method is that described in Crouch 2,631,175. The products, following epoxidation, are preferably liquids having a viscosity up to 500,000 centipoises within the temperature range 0 to 100° C.

It is these epoxidized polymers which I mix with the phenol aldehyde condensates which are known in the prior art.

The phenol aldehyde condensates used for reaction with polyepoxides are products formed by the reaction of phenols and aldehydes, particularly formaldehyde, to form condensation products containing reactive hydroxyl groups. Phenol and formaldehyde, for example, react to form somewhat different reaction products depending upon the proportions and conditions of reaction, and including reaction products such as phenol alcohols having both phenolic and alcoholic hydroxyl groups, and reaction products of the diphenolmethane type containing phenolic hydroxyl groups. The phenol aldehyde resins at an initial or intermediate stage of reaction are included in such phenol aldehyde condensates. The condensation of phenol and formaldehyde can be carried out with the use of either acid or basic condensing agents and in some cases by first combining the aldehyde with a base such as ammonia to form hexamethylenetetramine and reacting it with the phenol to form the phenol aldehyde condensate.

In general, the phenol aldehyde condensates should not have their condensation carried so far that they become insoluble and non-reactive but should be used at an intermediate stage or at a stage of reaction such that they contain reactive phenolic hydroxyl groups or both phenolic and alcoholic hydroxyl groups. Initial and intermediate products such as are made in producing phenol aldehyde resins can be used provided the condensation is carried only to an intermediate stage such that the products can be blended with the epoxidized liquid diene polymer and caused to react therewith.

The phenol aldehyde condensates can be derived from mononuclear phenols, polynuclear phenols, monohydric phenols or polyhydric phenols so long as the reaction product is a liquid or semi-solid which is miscible with the epoxidized liquid diene polymer. The phenol aldehyde condensate can be a water soluble type or an alcohol soluble type or an oil soluble type. The phenol aldehyde condensate can also be a heat converting type or it can be a permanently fusible type.

Typical commercial phenol/formaldehyde resins which can be employed in the practice of this invention are those sold under trade designations (i.e., Bakelite A, General Electric Company Resin R-108, Durez 1590, and Varcum 2896-B).

In the practice of this invention, the phenolic resins are blended with the epoxidized polymer in any convenient manner. Commonly, for 100 parts by weight of resin, it is desirable to use about 5 to 50 parts of the phenolic resin for, correspondingly, 95 to 50 parts of epoxidized polymer. Solvents or thinners can be used which are compatible with the polymers to effect any desired decrease in viscosity and permit convenient application by dipping, brushing and spraying. The solvent can be added separately or with either of the polymers. Suitable solvents comprise toluene, xylene, isoamyl alcohol, methyl ethyl ketone, cyclohexanol, and methyl isobutyl ketone.

Catalysts can be used to modify the rate of cure or hardening of the compositions. Suitable catalysts comprise acidic reagents such as the inorganic acids and salts of some polyvalent metals. Examples of such catalysts are sulfuric acid, phosphoric acid, boric acid, aluminum chloride, zinc chloride, ferric chloride, stannic chloride, titanium tetrachloride, cobalt chloride, nickel chloride and boron trifluoride. Basic catalysts such as diethylene-triamine, triethylenetetraamine, calcium hydroxide, sodium hydroxide, and potassium hydroxide can be used. The concentration and type of catalyst can be selected depending upon individual conditions. Generally, concentrations of 1 to 10 parts by weight per 100 parts of the total polymer weight are adequate. The catalyst can be added as a suspension or solution, if desired; and, as is well known, the catalyst addition can be made just prior to application of the resin mixture.

Various pigments such as carbon black and fillers such as wood flour can be advantageously blended in these resin compositions.

The conditions of cure can depend upon the end use as well as the composition of the resin. Fluid mixtures containing a solvent, when used as coatings, will frequently be cured at low temperatures, frequently from 25° C. to 75° C., to avoid blistering. However, subsequently the temperature of cure can be increased to 250° C. and higher. The length of cure can be varied depending upon the properties which are desired. At 100 to 250° C. satisfactory cure can be frequently achieved within 10 hours, but prolonged cure (e.g., 100 to several hundred hours) can be applied to obtain an increase in hardness of the compositions.

The epoxidized liquid diene polymers used in the following examples were prepared from liquid polybutadiene, prepared according to the method of Crouch 2,631,175 and having a viscosity of about 150 Saybolt Furol seconds at 100° F. and an unsaturation of 80 percent of theoretical, e.g., 0.8 double bond per $C_4$ unit. The liquid polymer was stripped in a batch operation by flushing for 45 minutes with nitrogen at a temperature of 190° to 200° C. and at a pressure of 10 to 20 mm. Hg absolute. This polymer was epoxidized by dissolving 432 grams of the polymer in two liters of chloroform to which was added 280 grams of a nuclear sulfonated ion exchange resin (Amberlite IR-120) in the acid form and 35 mls. of glacial acetic acid. The temperature was 43° C. To this mixture there was added 266 grams of 50 percent hydrogen peroxide over a period of 30 to 40 minutes while maintaining the temperature at 43° C. The mixture was stirred for 2.5 hours at this temperature. The ion exchange resin was removed by filtration. Then 500 milliliters of water were added, the aqueous phase was removed, and the polymeric product washed several times with dilute aqueous sodium bicarbonate and then with water. The neutral organic phase was dried over anhydrous sodium sulfate and the solvent was stripped by warming under vacuum.

The thus prepared epoxidized polymer was then analyzed for epoxy oxygen content and total oxygen content. Epoxy oxygen content was determined by the hydrochloric acid-dioxane method given in Organic Analysis, Mitchell et al., volume 1, pages 135-136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

I have prepared many batches of epoxidized liquid polybutadiene using this exact procedure will small variations in the amount of oxygen introduced. The starting material for Example I contained 6.7 percent by weight of epoxy oxygen and a total oxygen content of 10.3 percent on the same basis. Assuming that all the oxygen was present as either epoxy oxygen or hydroxyl oxygen, this corresponds to 0.32 epoxy group per double bond originally present in the liquid polybutadiene. The starting material for the runs of Example II contained 6.9 percent epoxy oxygen and 10.5 percent total oxygen. This corresponds to 0.33 epoxy group per double bond originally present.

EXAMPLE I

Epoxidized liquid polybutadiene was blended with various phenol aldehyde polymers, the liquid products being mixed with stirring at room temperature in an open container. The catalyst, either 85 percent phosphoric acid or diethylenetriamine, was then mixed into the blend and the viscosity measured at room temperature (approximately 25° C.) with a Brookfield viscometer. Each

*Table I.—Epoxidized polybutadiene admixed with phenolic resins*

| Run No. | Amount Used in Parts by Weight | | | | | | Brookfield Viscosity, Centipoises | Shore D Hardness After 100° C. for— | | | | | |
|---|---|---|---|---|---|---|---|---|---|---|---|---|---|
| | Epoxidized Liquid Polybutadiene | Phenolic resin | | | | Diethylene Triamine | 85% Phosphoric Acid | | 7 hours | 10 hours | 14 hours | 77 hours | 85 hours | 92 hours |
| | | G.E. R-108 | Durez 1590 | Varcum 2896-B | Butvar B-76 | | | | | | | | | |
| 1 | 10 | | | | | | | Over 400,000 | | | 0 | | | 5 |
| 2 | 10 | | | | | 0.6 | | 272,000 | | | | (19@56 hr.) | | |
| 3 | 8 | 2 | | | | 1 | 0.1 | Over 400,000 | | | 0 | | | 33 |
| 4 | 7 | 3 | | | | 1 | 0.1 | Over 400,000 | | | 0 | | | |
| 5 | 9 | | 1 | | | | | Over 400,000 | | | | 3 | 3 | |
| 6 | 9 | | 1 | | | 0.6 | | 123,800 | 8 | 12 | 16 | 52 | 57 | |
| 7 | 8 | | 2 | | | | | Over 400,000 | | | | 5 | 5 | |
| 8 | 8 | | 2 | | | 0.6 | | 153,400 | 20 | 25 | 35 | 70 | 70 | |
| 9 | 9 | | | 1 | | 0.6 | | 67,760 | 6 | 13 | 22 | 70 | 73 | |
| 10 | 8 | | | 2 | | 0.6 | | 74,600 | 15 | 20 | 30 | 75 | 79 | | produce was cured in an aluminum mold at 100° C. and, after cooling to room temperature, the Shore D hardness of each of the thermoset resins was determined. The results are set forth in Table I.

These results show that the addition of the phenol aldehyde resins accelerates the rate of cure of the product. An additional advantage is that the viscosity of the resin, prior to cure, is decreased without the addition of a solvent. For example, run 6, when compared with run 2, shows more than a 50 percent decrease in viscosity. These data also show that the thermosetting time can be accelerated by the addition of either acidic or basic catalysts.

Runs 3 and 4 illustrate the use of the resin blend of my invention with an additional resin, a polyvinyl butyral resin. Other resins, when compatible, can be blended with the products of my invention.

EXAMPLE II

Epoxidized liquid polybutadiene was mixed with a commercial phenolic resin and a portion of the same phenolic resin was blended with a different type of epoxy resin (Epon 1007), a resin made by condensing Bisphenol A[1] with epichlorohydrin. Curing of each blend was catalyzed with 85 percent phosphoris acid. The mixtures were then used to coat a glass plate using a Bird applicator, the coating being 0.006 inch. Following drying in air for various lengths of time, the film hardness was determined by a Sward Hardness Rocker, the results being set forth in Table II.

Table II

| Time, hr. | Coating Comprising— | |
|---|---|---|
| | Epoxidized Polybutadiene | Epon 1007 |
| 0.33 | Tack free | |
| 0.5 | | Tack free. |
| 1 | Rub free | |
| 3 | | Rub free. |
| 4 | 2 | 0. |
| 24 | 6 | 2. |

The formulation for these coating compositions was as follows:

| | Parts by weight |
|---|---|
| Epoxidized polybutadiene or Epon 1007 [1] | 11.1 |
| Phenolic resin [2] | 3.7 |
| Solvent [3] | 35 |
| Phosphoric acid, 85% | 0.2 |

[1] Shell Chemical Company Epon 1007, melting point 127–133° C. and described as condensation product of epichlorohydrin and Bisphenol A. The epoxide equivalent weight is 1550–2000 grams per equivalent epoxide.
[2] General Electric Co. resin R-108.
[3] The solvent was a mixture of equal parts by weight of xylene, toluent, isoamyl alcohol and methyl isobutyl ketone.

The results of Table II clearly indicate the advantage obtained by using the epoxidized liquid polybutadiene of the present invention, this being clearly apparent in the improved hardness obtained at the same curing time.

EXAMPLE III

When 200 parts by weight of formalin (40 percent formaldehyde in water) and 93 parts of phenol are mixed with 1.5 parts of potassium hydroxide and the mixture refluxed for one and one-half hours, a water insoluble condensate is formed. Mixtures of this condensate with the previously described epoxidized liquid polybutadiene and diethylenetriamine or phosphoric acid cure to hard resins at 100° C. For instance, a mixture of 9 parts by weight of the epoxidized polymer, 1 part of the phenol formaldehyde condensate, and 0.6 part of diethylenetriamine cures to a resin having a Shore D hardness of approximately 70 in 75 hours at 100° C.

As many possible embodiments can be made of this invention without departing from the scope thereof, it is to be understood that all matter herein set forth is to be interpreted as illustrative and not as unduly limiting the invention.

I claim:
1. The method of producing a hard thermoset resin comprising mixing, per 100 parts by weight, 95 to 50 parts of an epoxidized liquid polymer of a conjugated diene containing 4 to 6 carbon atoms containing 0.08 to 0.8 1,2-epoxy groups per aliphatic double bond originally present in the polymer and at least 10 percent of the original aliphatic unsaturation, 5 to 50 parts of a reactive phenol aldehyde condensate containing reactive hydroxyl groups and, based upon 100 parts of the above components, a catalyst selected from the group consisting of sulfuric acid, phosphoric acid, boric acid, aluminum chloride, zinc chloride, nickel chloride, boron trifluoride, diethylene triamine, triethylene tetraamine, calcium hydroxide, sodium hydroxide, and potassium hydroxide, heating the mixture at a temperature of 20 to 250° C. for a time of 10 to 100 hours.

2. The method of claim 1 wherein said catalyst is phosphoric acid.

3. The method of claim 1 wherein said catalyst is diethylene triamine.

4. A thermosetting resin comprising, per 100 parts by weight, 95 to 50 parts of an epoxidized liquid polymer of a conjugated diene containing 4 to 6 carbon atoms containing 0.08 to 0.8 1,2-epoxy groups per aliphatic double bond originally present in the polymer and at least 10 percent of the original aliphatic unsaturation, and 5 to 50 parts of a reactive phenol aldehyde condensate containing reactive hydroxyl groups.

5. A thermosetting resin comprising, per 100 parts by weight, 95 to 50 parts of epoxidized liquid polybutadiene containing 0.08 to 0.8 1,2-epoxy groups per aliphatic double bond originally present in the polymer and at least 10 percent of the original aliphatic unsaturation, and 5 to 50 parts of a reactive phenol aldehyde condensate containing reactive hydroxyl groups.

6. A thermosetting resin comprising, per 100 parts by weight, 95 to 50 parts of epoxidized liquid polybutadiene containing 0.08 to 0.8 1,2-epoxy groups per aliphatic double bond originally present in the polymer and at least 10 percent of the original aliphatic unsaturation, 5 to 50 parts of a reactive phenol aldehyde condensate containing reactive hydroxy groups and, based upon 100 parts of the above components, 1 to 10 parts of a catalyst selected from the group consisting of sulfuric acid, phosphoric acid, boric acid, aluminum chloride, zinc chloride, nickel chloride, boron trifluoride, diethylene triamine, triethylene tetraamine, calcium hydroxide, sodium hydroxide, and potassium hydroxide.

7. The resin of claim 6 wherein said catalyst is phosphoric acid.

8. The resin of claim 6 wherein said catalyst is diethylene triamine.

References Cited in the file of this patent

UNITED STATES PATENTS

| 2,521,911 | Greenlee | Sept. 12, 1950 |
| 2,725,981 | Abere et al. | Dec. 6, 1955 |
| 2,758,953 | Cottle et al. | Aug. 14, 1956 |
| 2,826,556 | Greenspan et al. | Mar. 11, 1958 |

---
[1] p,p-Isopropylidenediphenol.